United States Patent
Ko et al.

(10) Patent No.: US 9,748,819 B2
(45) Date of Patent: Aug. 29, 2017

(54) MOTOR WITH OIL FLOWING SPACES

(71) Applicant: HON HAI PRECISION INDUSTRY CO., LTD., New Taipei (TW)

(72) Inventors: Jin-Yu Ko, New Taipei (TW); Shih-Hsin Hsu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 299 days.

(21) Appl. No.: 14/584,222

(22) Filed: Dec. 29, 2014

(65) Prior Publication Data

US 2015/0188393 A1 Jul. 2, 2015

(30) Foreign Application Priority Data

Dec. 31, 2013 (TW) .............................. 102149329 A (51) Int. Cl.
*H02K 9/19* (2006.01)
*H02K 5/20* (2006.01)

(52) U.S. Cl.
CPC ................. *H02K 9/19* (2013.01); *H02K 5/20* (2013.01)

(58) Field of Classification Search
CPC .......... H02K 9/19; H02K 9/193; H02K 9/197; H02K 5/20; H02K 9/20; H02K 5/18
USPC ............................ 310/60 R, 52–65
See application file for complete search history.

(56) References Cited

U.S. PATENT DOCUMENTS

| 4,250,423 A * | 2/1981 | Linscott, Jr. | H02K 1/185 310/64 |
| 4,885,493 A * | 12/1989 | Gokhale | H02K 21/14 310/117 |
| 6,441,524 B2 * | 8/2002 | Kaneko | H02K 1/2766 310/156.45 |
| 2008/0185923 A1 * | 8/2008 | Noe | H02K 9/197 310/43 |
| 2009/0121562 A1 * | 5/2009 | Yim | H02K 9/19 310/54 |
| 2010/0033040 A1 * | 2/2010 | Wakita | H02K 9/19 310/54 |
| 2010/0052465 A1 * | 3/2010 | Hayashi | H02K 1/185 310/216.009 |
| 2011/0298317 A1 * | 12/2011 | Bradfield | H02K 9/19 310/58 |
| 2011/0298318 A1 * | 12/2011 | Bradfield | H02K 9/19 310/58 |

(Continued)

FOREIGN PATENT DOCUMENTS

TW  M460931 U1  9/2013

*Primary Examiner* — Michael Andrews
(74) *Attorney, Agent, or Firm* — Steven Reiss (57) ABSTRACT

A motor includes a rotor, a stator, a housing, and a driving shaft. The rotor includes a rotor body and two rotor covers fixed with two ends of the rotor body respectively. The stator sleeves on the rotor body. The housing sleeves on the stator. The housing includes a base body, a first cover, and a second cover. The base body sleeves on the stator. The first cover and the second cover assembling with opposite ends of the base body correspondingly. The first cover defines an oil inlet hole and an oil outlet hole. A driving shaft passes through and non-rotatably connected to the rotor body and the two rotor covers. Two recesses are separately formed in an inner surface of the base body and two gaps formed between the base body and the stator thereof corresponding to the oil inlet hole and the oil outlet hole.

17 Claims, 6 Drawing Sheets

(56) References Cited

U.S. PATENT DOCUMENTS

2011/0309726 A1* 12/2011 Carpenter ............. H02K 1/182
310/75 R

* cited by examiner

MOTOR WITH OIL FLOWING SPACES

FIELD

The subject matter herein generally relates to a driving mechanism, and particularly to an oil-cooled motor.

BACKGROUND

One of the most common and important problems in the application of motors is the temperature rise resulting from various losses, such as copper losses, brush-contact loss, core loss, mechanical loss, stray load loss, etc. And, as well known in the art, the operating temperature of a motor is closely associated with its life expectancy, because deterioration of the insulation is a function of both time and temperature. Therefore, various cooling means or ventilating systems are proposed for such machines to remove the heat arising from the inevitable losses, and thus to prevent overheating of the machines.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

The present disclosure is in relation to a motor. A motor can include a rotor, a stator, a housing, and a driving shaft. The rotor can have a rotor cover. A stator can sleeve on the rotor. The housing can sleeve on the stator. The housing can define an oil inlet hole and an oil outlet hole. The driving shaft can pass through and be non-rotatably coupled to the rotor. Two end portions of the driving shaft can protrude out from the housing. An inner sidewall of the housing and an outer sidewall of the stator can cooperatively form a gap in fluid communication with the oil inlet hole and the oil outlet hole. The inner sidewall of the housing, the outer sidewall of the stator, a sidewall towards the housing of the rotor cover, an inner wall of the housing, and an outer wall of the driving shaft cooperatively define a flowing space. The oil inlet hole, the gap, the flowing space, and the oil outlet hole cooperatively define an oil cooling channel.

Figure 1:
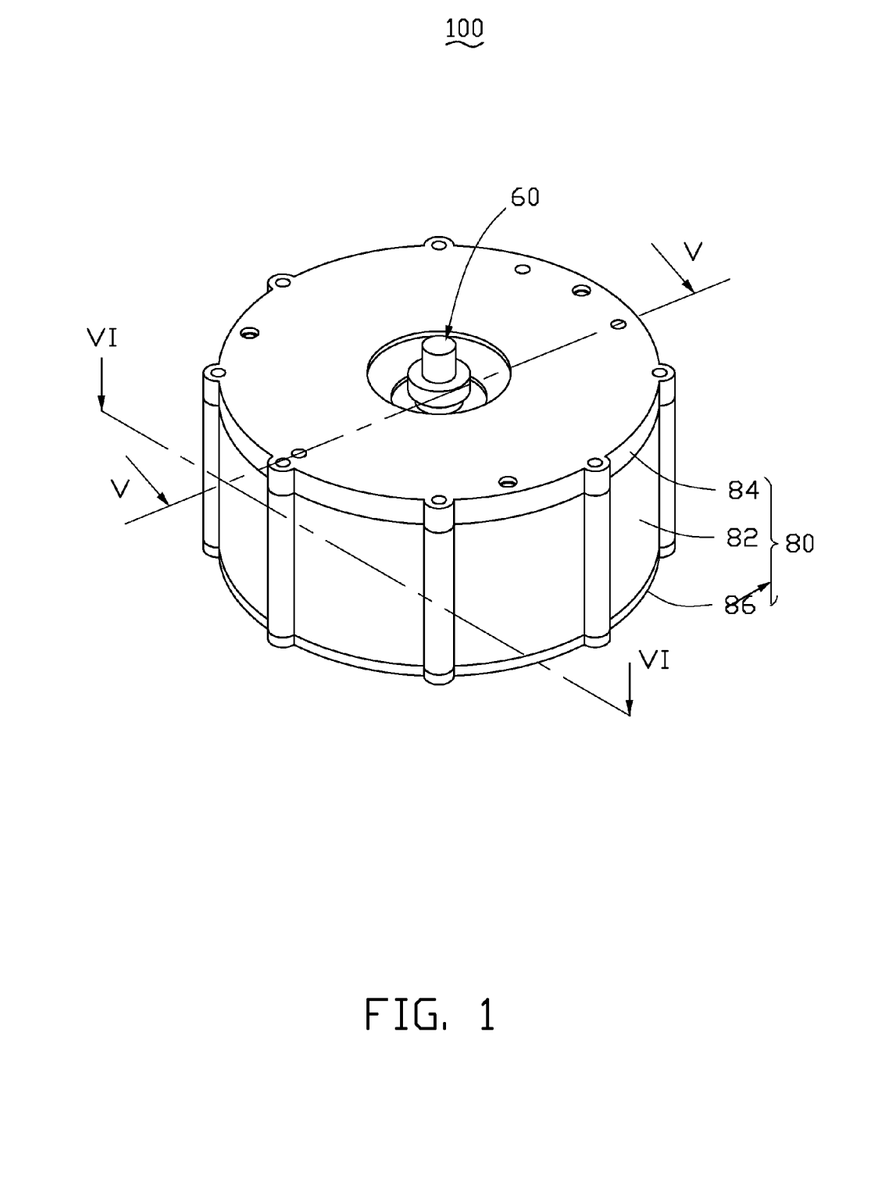
FIG. 1 illustrates an isometric and assembled view of a motor including a rotor.
Figure 2:
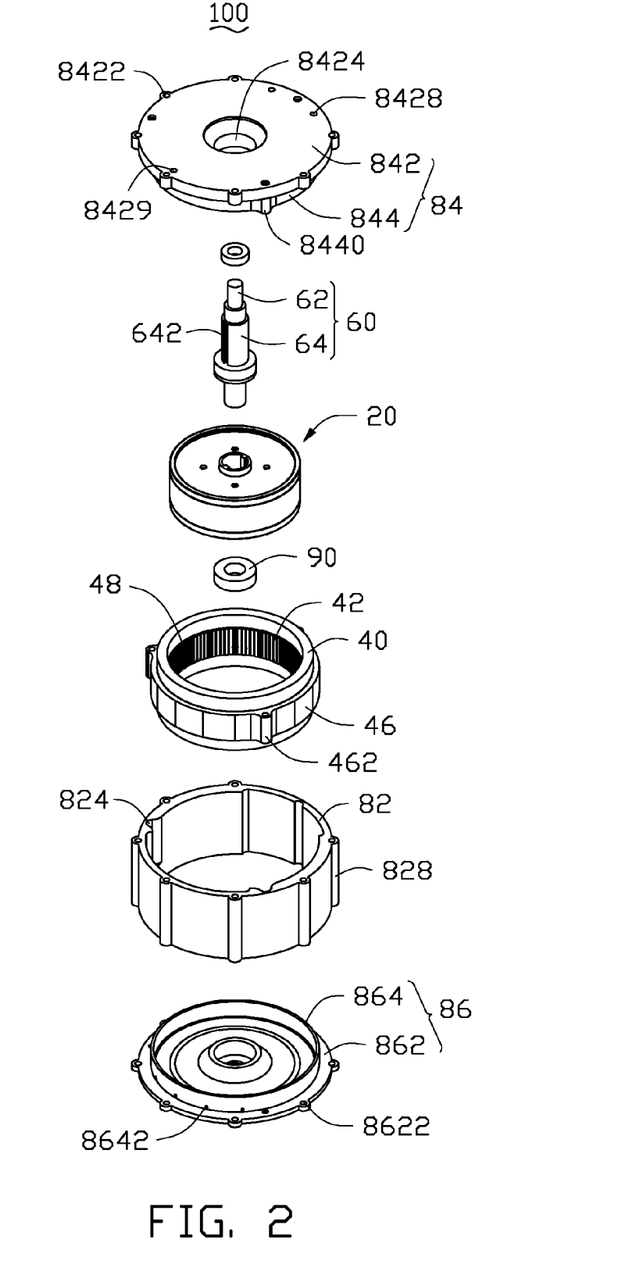
FIG. 2 is an exploded, isometric view of the motor of FIG. 1.
Figure 3:
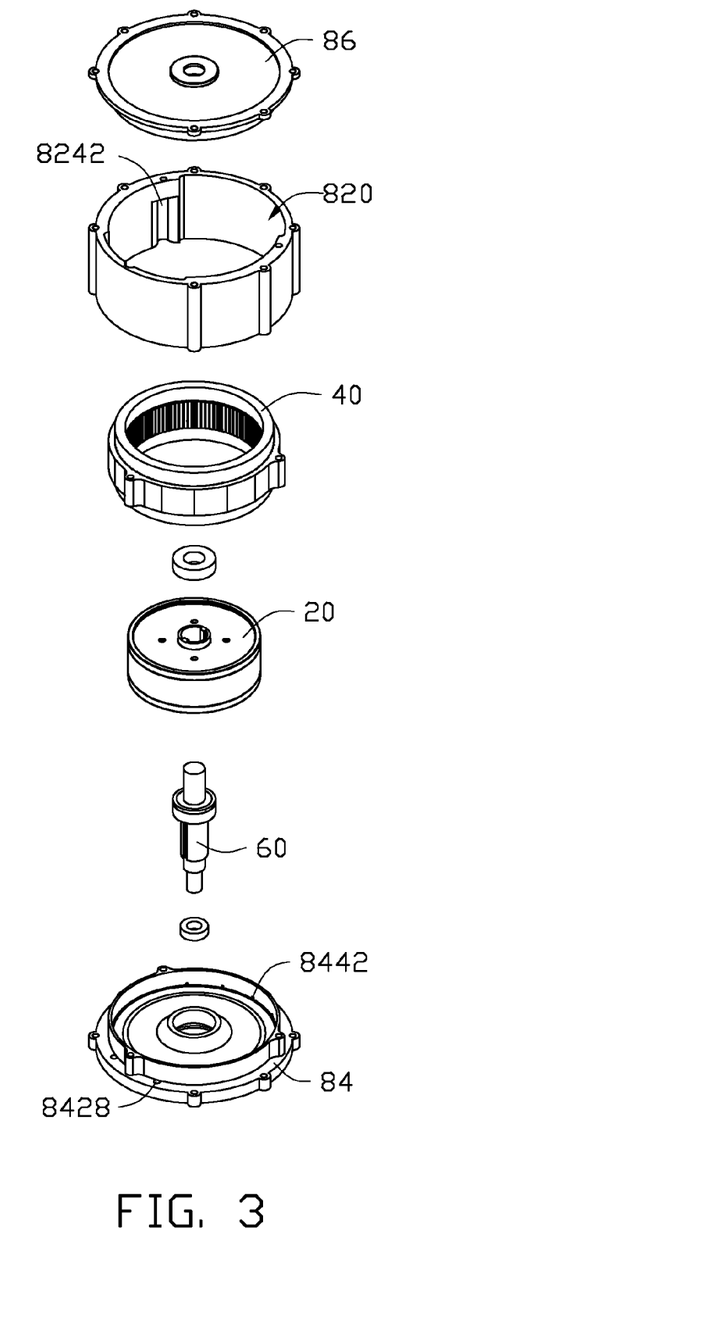
FIG. 3 is similar to FIG. 2, but viewed from another angle.

FIG. 1 illustrates a motor 100. Referring also to FIGS. 2 and 3, the motor 100 can include a rotor 20, a stator 40, a driving shaft 60, and a housing 80. The stator 40 can sleeve on the rotor 20. The rotor 20 and the stator 40 can be received in the housing 80. The driving shaft 60 can pass through and non-rotatably be coupled to the rotor 20. Two end portions of the driving shaft 60 can protrude out from the housing 80. The rotor 20 and the driving shaft 60 can rotate relative to the stator 40 and the housing 80.

Figure 4:
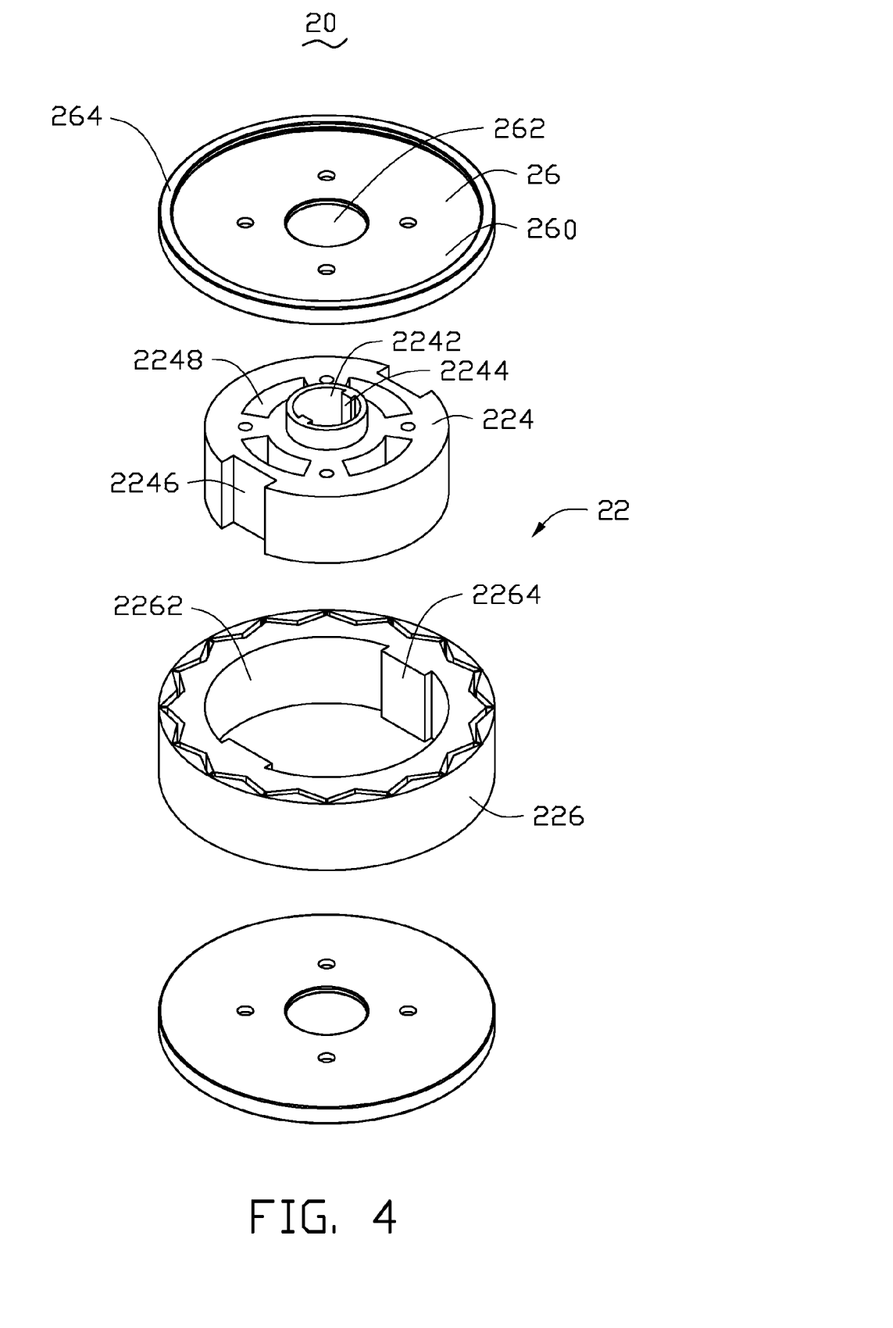
FIG. 4 illustrates an exploded, isometric view of the rotor of the motor shown in FIG. 1.

Referring to FIG. 4, the rotor 20 can include a rotor body 22 and two rotor covers 26 respectively fixed with two ends of the rotor body 22. The rotor body 22 can include a first rotor body 224 and a second rotor body 226 sleeving on and non-rotatably coupled with the first rotor body 224. A through hole 2242 can be defined through a substantial center portion of the first rotor body 224. A pair of first engaging portions 2244 can be oppositely formed on an inner wall of the through hole 2242. A pair of second engaging portions 2246 can be oppositely formed on an outer wall of the first rotor body 22. In the embodiment, the pair of second engaging portions 2246 is recess grooves. Four arcuate retaining holes 2248 can be defined through the first rotor body 224 around the through hole 2242 for holding magnets. The second rotor body 226 can define a receiving hole 2262. A pair of third engaging portions 2264 can be formed on an inner wall of the receiving hole 2262 corresponding to the pair of second engaging portions 2246. The first rotor body 224 can be received in the receiving hole 2262. Each third engaging portion 2264 can be received in and engaged with a respective one second engaging portion 2246 for non-rotatably coupling the second rotor body 226 and the first rotor body 224. An area of each rotor cover 26 can fit over an area of the second rotor body 226. Each rotor cover 26 can be fixed with one end surface of the first rotor body 224 and cover respective end surfaces of the second rotor body 226 and the first rotor body 224. Each rotor cover 26 can include a cover body 260 and a guiding flange 264. The cover body 262 of each rotor cover 26 can be fixed with one respective one end of the rotor body 22. The guiding flange 264 can protrude from a round edge of the cover body 260 to a vertical axis of the cover body 260 for guiding a cooling oil flowing in the motor 100. A through hole 262 can be defined in each rotor cover 26.

The stator 40 can sleeve on the second rotor body 226. Referring to FIG. 2 again, the stator 40 can include a stator body 42 and the mounting ring 46 formed on the on an outer sidewall of the stator body 42 along a circumferential direction of the stator body 42. An air gap (not shown) can be formed between an inner sidewall of the stator body 42 and an outer sidewall of the second rotor body 226. A coil 48 can be positioned in the stator body 42. Three mounting portions 462 can separately protrude from the outer sidewall of the mounting ring 46. Each mounting portion 462 can extend along a direction parallel to a center axis of the stator body 42.

The driving shaft 60 can include a shaft body 62 and a connection body 64 formed on the shaft body 62. The shaft body 62 can pass through the through hole 2242. A pair of fourth engaging portions 642 can be formed on an outer sidewall of the connection body 64 corresponding to the pair of first engaging portions 2244. Each first engaging portion 2244 can be received in a corresponding one fourth engaging portion 642, thereby the driving shaft 60 can be non-rotatably connected to the first rotor body 224. In the illustrated embodiment, the shaft body 62 and a connection body 64 can be integrally formed.

Figure 5:
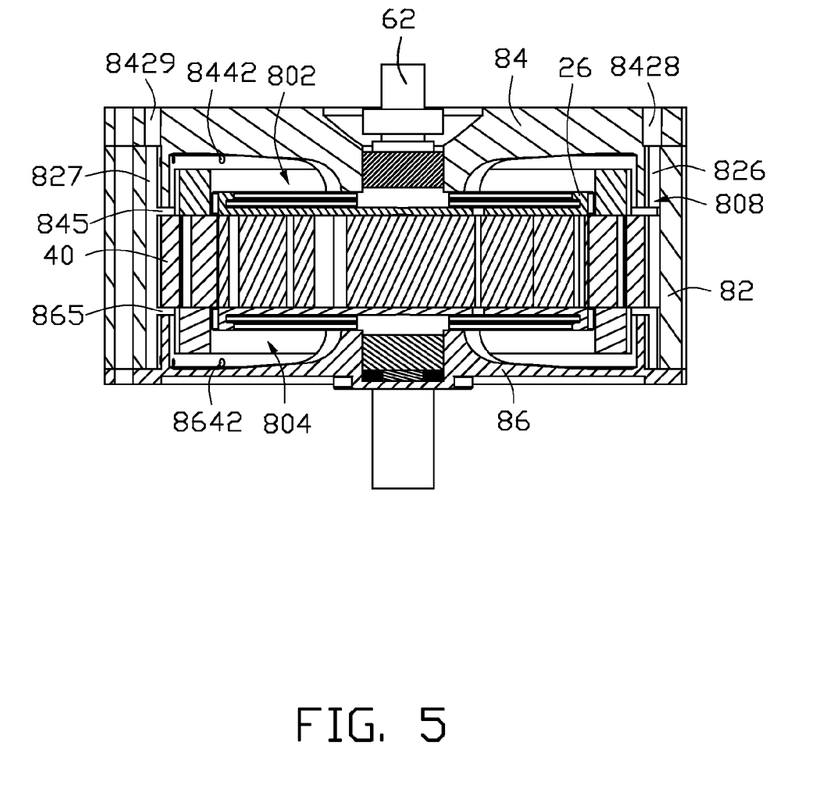
FIG. 5 illustrates a cross-sectional view of the motor of FIG. 1 along a line V-V.
Figure 6:
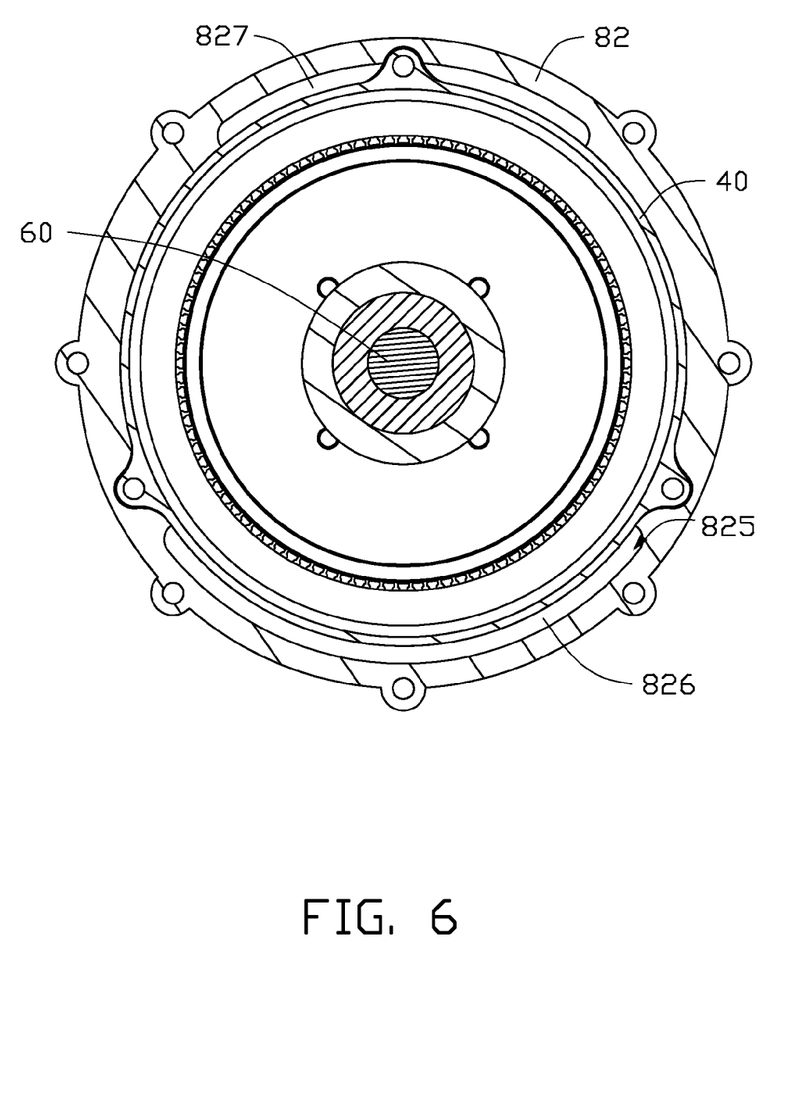
FIG. 6 illustrates a cross-sectional view of the motor of FIG. 1 along a line VI-VI.

Also referring to FIGS. 5 and 6, the housing 80 can include a base body 82, a first cover 84, and a second cover 86. The base body 82 can sleeve on the stator body 42. Two recesses 820 (as shown in FIG. 3) can be separately formed in an inner wall of the base body 82. The base body 82 can further include three receiving grooves 824 formed on the inner wall of the base body 82 corresponding to the three mounting portions 462, and one receiving groove 824 can be formed on a bottom surface of one of the recesses 820. A resisting shoulder 8242 (as shown in FIG. 3) can be formed on a wall of the receiving groove 824 adjacent to the second cover 86. Two receiving grooves 824 have resisting shoulders 8242. Each mounting portion 462 can be received in one receiving groove 824. The resisting shoulder 8242 can resist with a respective one mounting portion 462. Thereby, a gap 825 can be formed between the inner wall of the base body 82 and the outer sidewall of the stator body 42. The gap 825 can include a first gap 826 and a second gap 827 coupled to the first gap 826. A plurality of locking portions 828 can be formed on the outer sidewall of the base body 82. The number of the recesses 820, the number of the receiving grooves 824, and the numbers of the first gap 826 and the second gap 827 can be selected according to real application.

The first cover 84 can be fixedly positioned on a first end of the base body 82, and the second cover 86 can be fixedly positioned on a second end of the base body 82. The first cover 84 can include a first main body 842 and a first extension body 844 protruding from the first main body 842. A plurality of protrusion ears 8422 can be formed on an edge of the first main body 842 corresponding to the plurality of locking portions 828, and each locking portion 828 can be fixed with a respective one protrusion ear 8422. A penetrating hole 8424 can be defined in the first main body 842 corresponding to the through hole 2242 for receiving the driving shaft 60. Two oil inlet holes 8428 and one oil outlet hole 8429 (as shown in FIG. 2) can be separately defined in the first main body 842. The two oil inlet holes 8428 can correspond to and be coupled to the first gap 826. The oil outlet hole 8429 can correspond to and be fluid communicate to the second gap 827. The first extension body 844 can be fixed with the mounting ring 46. A clearance 845 can exist between the first extension body 844 and the mounting ring 46. Three installation portions 8440 can be formed corresponding to the three mounting portions 462. Each installation portion 8440 can be fastened with one mounting portions 462. Two oil inlet holes 8428 can be positioned opposite sides of one installation portion 8440. The oil outlet hole 8429 can be positioned oppositely to the two oil inlet holes 8428. A plurality of connecting holes 8442 can be defined in a sidewall of the first main body 842 and fluid communicated with the first gap 826.

A structure of the second cover 86 can be similar with a structure of the first cover 84. The second cover 86 can include a second main body 862 and a second extension body 864 protruding from the second main body 862. A plurality of protrusion ears 8622 can be formed on a second main body 862 corresponding to the plurality of locking portions 828, and each locking portion 828 can be fixed with a respective one protrusion ear 8422. A penetrating hole 8624 can be defined in the first cover 84 corresponding to the through hole 2242 for receiving the driving shaft 60. The second extension body 864 can be fixed with the mounting ring 46. A clearance 865 can exist between the second extension body 864 and the mounting ring 46. A plurality of connecting holes 8642 can be defined in a sidewall of the second main body 862 and coupled to the first gap 826. The second extension body 864 can stretch into the base body 82. The shaft body 62 can protrude from the penetrating hole 8424 and the penetrating hole 8624.

The motor 100 can further include two bearings 90. One bearing 90 can be sleeved on one end of the shaft body 62 adjacent to the first cover 84, received in the penetrating hole 8424, and positioned above the connecting body 64. Another bearing 90 can be sleeved on another one end of the shaft body 62 adjacent to the second cover 86, received in the penetrating hole 8624, and positioned under the connecting body 64.

The sidewall of the first cover 84 facing the stator 40, the sidewall of a first rotor cover 26 adjacent to the first cover 84, a sidewall of one bearing 90 adjacent to the first cover 84, a sidewall of the driving shaft 60, and the outer wall of the stator 40 can cooperative form a first flowing space 802. The first flowing space 802 can be fluid communicated with the first gap 826 and the second gap 827. A second flowing space 804 can be cooperative formed by a sidewall of the second cover 86 toward the stator 40, the outer wall of the stator 40, a sidewall of a second rotor cover 26 positioned adjacent to the second cover 86, and the outer wall of the driving shaft 60. The first flowing space 802 can be fluid communicated with the second flowing space 804, and the first flowing space 802 and the second flowing space 804 can form a flowing space of the motor 100. The oil inlet holes 8428, the first gap 826, the clearance 845, the clearance 865, the second gap 827, the connecting holes 8442, the connecting holes 8642, the first flowing space 802, the second flowing space 804, and the oil outlet hole 8429 can cooperative form an oil cooling channel 808.

In assembly, the second rotor body 226 can be sleeved on and non-rotatably coupled to the first rotor body 224. The two rotor covers 26 can be fixed with two ends of the first rotor body 224 respectively. The stator 40 can be sleeved on the second rotor body 226. The driving shaft 60 can pass through the rotor 20. The connection body 64 can be non-rotatably coupled to the first rotor body 224. The two bearings 90 can be sleeved on the shaft body 62.

In use, cooling oil can be injected into the first gap 826 of the motor 100 via the oil inlet holes 8428. The cooling oil can flow into the first flowing space 802 and the second flowing space 804 via the connecting holes 8442, the connecting holes 8642, the clearance 845, and the clearance 865, for cooling the inner wall of the stator 40, the coil 48 of the stator 40, the driving shaft 60, and the bearings 90. The cooling oil can flow into the second gap 827 via the clearance 845 and the clearance 865, or directly flow into the second gap 827, and finally flow out of the motor 100 via the oil outlet hole 8429.

The two rotor covers 26 fixed with the rotor body 22 can stop the cooling coil from entering the air gap between the stator 40 and the rotor body 22.

The number of the oil inlet holes 8428 can be not limited to be two; it can be one, three, or more. The number of the oil outlet hole 8429 can be not limited to be one, it can be two, three, or more. The positions of the oil inlet holes 8428 and the oil outlet hole 8429 can be at first cover 84 or at second cover 86 according to real application. For example, the oil inlet hole 8428 can be defined in the first cover 84, and the oil outlet hole 8429 can be defined in the second cover 86. The oil inlet holes 8428 and the oil outlet hole 8429 just can be interconnected to the flowing space and the gaps.

The numbers and the positions of the connecting holes 8642, 8442 can be positioned according to real application. The first extension body 844 of the first cover 84 can be omitted, and the second extension body 864 of the second cover 86 can be omitted. Then, the connecting holes 8642, 8442 can be omitted.

The mounting ring 46 of the stator 40 can be omitted.

The number of the mounting portions 462 can be positioned according to real application. The number of the receiving grooves 824 corresponding to the number of the mounting portions 462. The base body 82 can be directly assembled with the stator 40. The protrusion ear 8422 of the first cover 84 and the protrusion ear 8642 of the second cover 86 can be omitted, and the first cover 84 and the second cover 86 are directly fixed with the base body 82 via some fasteners.

The embodiments shown and described above are only examples. Many details are often found in the art such as the other features of a stator. Therefore, many such details are neither shown nor described. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A motor, comprising:
    a rotor having a rotor cover;
    a stator sleeving on the rotor;
    a housing sleeving on the stator, the housing defining an oil inlet hole and an oil outlet hole; and
    a driving shaft passing through and being non-rotatably coupled to the rotor, two end portions of the driving shaft protruding out from the housing;
    wherein an inner sidewall of the housing and an outer sidewall of the stator cooperatively form a gap in fluid communication with the oil inlet hole and the oil outlet hole;
    wherein the inner sidewall of the housing, the outer sidewall of the stator, and an outer wall of the driving shaft cooperatively define a flowing space;
    wherein the oil inlet hole, the gap, the flowing space, and the oil outlet hole cooperatively define an oil cooling channel; and
    wherein the housing comprises a base body, a first cover, and a second cover, the first cover is fixedly positioned on a first end of the base body, and the second cover is fixedly positioned on a second end of the base body, the gap is formed between an inner wall of the base body and the outer sidewall of the stator, the flowing space comprises a first flowing space and a second flowing space, the first flowing space is cooperatively formed by a sidewall of the first cover toward the stator, an outer wall of the stator, a sidewall of the rotor cover positioned adjacent to the first cover, and the outer wall of the driving shaft; the second flowing space is cooperatively formed by a sidewall of the second cover toward the stator, the outer wall of the stator, a sidewall of one rotor cover positioned adjacent to the second cover, and the outer wall of the driving shaft; the oil inlet hole and the oil outlet hole are defined in one of the first cover and the second cover.

2. The motor of claim 1, wherein the rotor further comprises a rotor body, the number of the rotor cover is two, each rotor cover is fixed with and cover an end of the rotor body.

3. The motor of claim 2, wherein each rotor cover comprises a cover body and a guiding flange protruding from a round edge of the cover body, the cover body of each rotor cover is fixed with one respective one end of the rotor body, and the guiding flange is configured to guide cooling oil flowing in the motor.

4. The motor of claim 1, wherein the first cover comprises a first main body and a first extension body protruding from the first main body, the first extension body stretches into the base body, and the oil inlet hole and the oil outlet hole are separately defined in the first main body.

5. The motor of claim 4, wherein the first extension body defines a plurality of connecting holes on the first extension body.

6. The motor of claim 4, wherein the housing further comprises a plurality of locking portions separately formed on the base body along a circumferential direction of the base body, a plurality of protrusion ears is formed on the first main body corresponding to the plurality of locking portions, and each locking portion is fixed with a respective one protrusion ear.

7. The motor of claim 1, wherein the stator comprises a stator body and a mounting ring formed on an outer sidewall of the stator body along a circumferential direction of the stator body, a first end portion of the stator body receives in the first cover, and the second end portion of the stator body receives in the second cover.

8. The motor of claim 1, wherein the second cover comprises a second main body and a second extension body protruding from the second main body, the second extension body stretches into the base body, and the oil inlet hole and the oil outlet hole are separately defined on the second main body.

9. The motor of claim 8, wherein the second extension body defines a plurality of connecting holes on the second extension body.

10. The motor of claim 1, wherein a plurality of receiving grooves is defined on an inner wall of the base body, a plurality of mounting portions is formed on the outer sidewall of stator corresponding to the plurality of receiving grooves, each mounting portions is received in a respective one receiving groove, and each mounting portions is fixedly connected with the first cover and the second cover.

11. A motor, comprising:
    a rotor comprising a rotor body and two rotor covers fixed with two ends of the rotor body respectively;
    a stator sleeving on the rotor body and the two rotor covers;

a housing sleeving on the stator, the housing comprising a base body, a first cover, and a second cover, the base body sleeving on the stator, the first cover, and the second cover assembling with opposite ends of the base body correspondingly, the first cover being fixedly positioned on a first end of the base body, the second cover being fixedly positioned on a second end of the base body, the first cover defining an oil inlet hole and an oil outlet hole;

a driving shaft passing through and non-rotatably connected to the rotor body and the two rotor covers, two end portions of the driving shaft protruding from the housing, wherein two recesses are separately formed in an inner surface of the base body, thereby a gap formed between an inner surface of the base body and an outer sidewall of the stator, the gap comprises a first gap and a second gap, the first gap corresponds to the oil inlet hole, and the second gap corresponds to the oil outlet hole; an inner sidewall of the housing, the outer sidewall of the stator, and an outer wall of the driving shaft cooperatively define a flowing space, the flowing space comprises a first flowing space and a second flowing space, the first flowing space is cooperatively formed by a sidewall of the first cover toward the stator, an outer wall of the stator, a sidewall of one of the two rotor covers positioned adjacent to the first cover, and an outer wall of the driving shaft; the second flowing space is cooperatively formed by a sidewall of the second cover toward the stator, the outer wall of the stator, a sidewall of the other one of the two rotor covers positioned adjacent to the second cover, and the outer wall of the driving shaft; the oil inlet hole and the oil outlet hole are defined in one of the first cover and the second cover.

12. The motor of claim 11, wherein the base body further comprises a receiving groove defined in the inner side surface of the base body, the stator comprises a stator body and a mounting portion formed on the outer surface of the stator body, the mounting portion is received in the receiving groove, the mounting portion is fixed with the first cover.

13. The motor of claim 12, wherein the first cover comprises a first main body and a first extension body protruding from the first main body, the first extension body stretches into the base body, and the oil inlet hole and the oil outlet hole are separately defined on the first main body.

14. The motor of claim 13, wherein the stator further comprises a mounting ring formed on an outer sidewall of the stator body, a clearance exists between the first extension body and the mounting ring.

15. The motor of claim 13, wherein the first extension body defines a plurality of connecting holes on the first extension body.

16. The motor of claim 11, wherein the second cover comprises a second main body and a second extension body protruding from the second main body, the second extension body stretches into the base body, and the oil inlet hole and the oil outlet hole are separately defined on the second main body.

17. The motor of claim 16, wherein the second extension body defines a plurality of connecting holes on the second extension body.

* * * * *